United States Patent
White

Patent Number: 5,955,099
Date of Patent: Sep. 21, 1999

[54] COUGH DROP SUCKER WITH COVER

[76] Inventor: Wendy A. White, P.O. Box 1046, Centerpoint, Tex. 78010

[21] Appl. No.: 09/061,215

[22] Filed: Apr. 16, 1998

[51] Int. Cl.[6] .............................. B65D 81/00; B65D 6/00
[52] U.S. Cl. ........................ 424/440; 426/110; 426/115; 426/134; 220/4.22
[58] Field of Search .............................. 426/134, 91, 110, 426/115, 440; 220/4.22

[56] References Cited

U.S. PATENT DOCUMENTS

| | | | |
|---|---|---|---|
| D. 359,607 | 6/1995 | Yun | 426/134 |
| 1,646,534 | 10/1927 | Horowitz | 426/110 |
| 1,814,785 | 7/1931 | Broadwell | 426/110 |
| 1,933,596 | 11/1933 | Maclean | 426/134 |
| 2,162,224 | 6/1939 | Legge | 426/134 |
| 2,655,968 | 10/1953 | Simmons . | |
| 2,803,550 | 8/1957 | Ackalusky | 426/134 |
| 2,980,039 | 4/1961 | Jolly | 426/134 |
| 3,043,354 | 7/1962 | Fitzgerald . | |
| 3,088,643 | 5/1963 | Dunn | 426/134 |
| 3,432,027 | 3/1969 | Mueller | 426/115 |
| 3,481,458 | 12/1969 | Mayeaux | 426/134 |
| 3,821,425 | 6/1974 | Russell | 426/110 |
| 4,244,470 | 1/1981 | Burnham . | |
| 4,350,712 | 9/1982 | Kocharian et al. | 426/134 |
| 4,551,329 | 11/1985 | Harris | 426/134 |
| 5,066,502 | 11/1991 | Eales | 426/134 |
| 5,353,956 | 10/1994 | Wilson | 426/115 |
| 5,458,277 | 10/1995 | Wyzykowski | 426/110 |
| 5,503,857 | 4/1996 | Coleman et al. | 426/134 |
| 5,531,318 | 7/1996 | Coleman et al. | 426/115 |
| 5,702,742 | 12/1997 | Jones | 426/134 |

FOREIGN PATENT DOCUMENTS

| | | | |
|---|---|---|---|
| 2093433 | 9/1982 | United Kingdom | 426/134 |

*Primary Examiner*—Steven Weinstein

[57] ABSTRACT

A lollipop storage assembly is provided including a housing being selectably opened and closed. Also included is a sucking drop having a stick coupled thereto and extending therefrom. The stick is slidably connected to the housing.

1 Claim, 2 Drawing Sheets

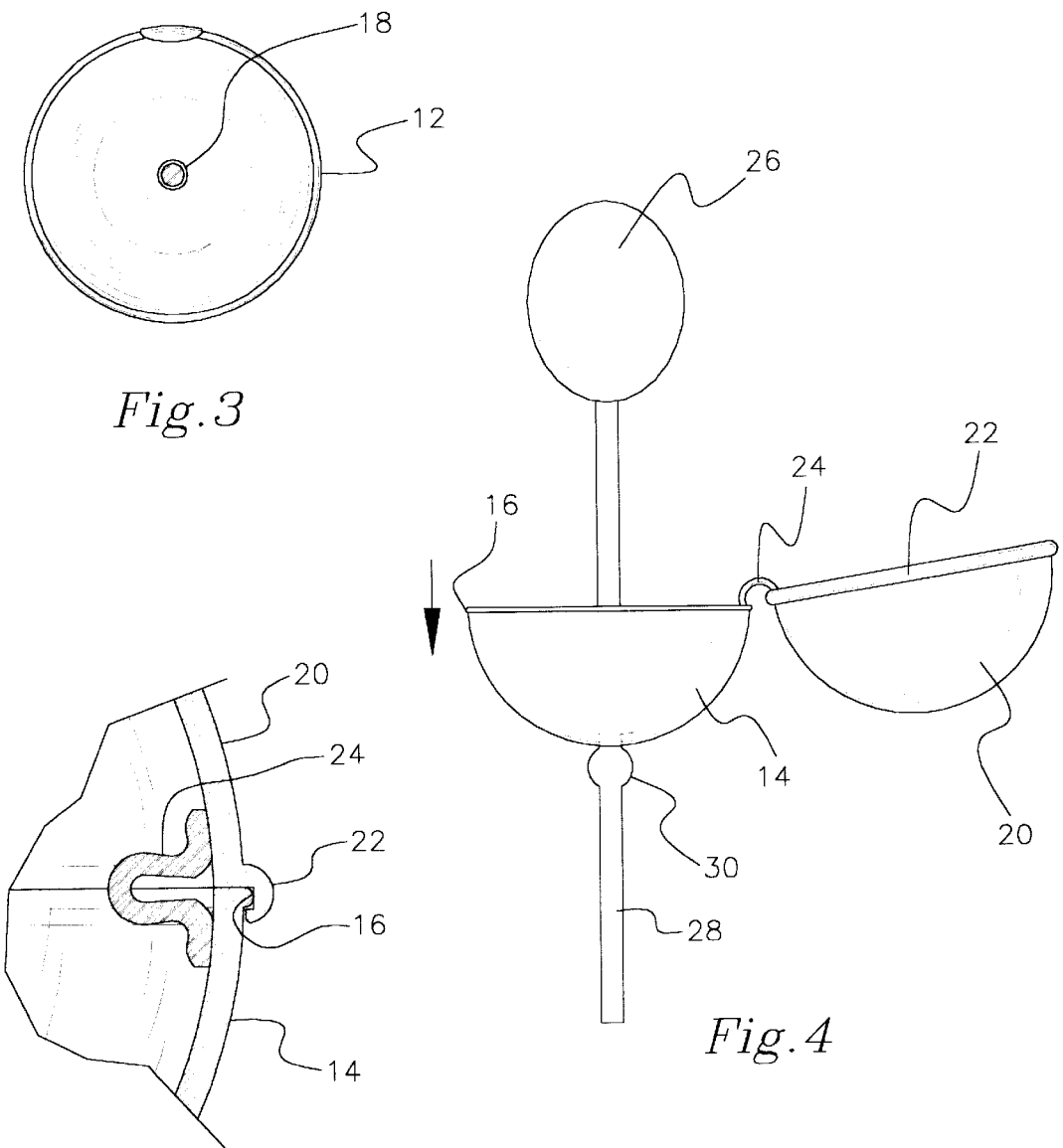

5,955,099

COUGH DROP SUCKER WITH COVER

BACKGROUND OF THE INVENTION

1. Field of the Invention

The present invention relates to lollipops and more particularly pertains to a new cough drop sucker with cover for storing and protecting a cough drop when not in use.

2. Description of the Prior Art

The use of lollipops is known in the prior art. More specifically, lollipops heretofore devised and utilized are known to consist basically of familiar, expected and obvious structural configurations, notwithstanding the myriad of designs encompassed by the crowded prior art which have been developed for the fulfillment of countless objectives and requirements.

Known prior art lollipops include U.S. Pat. No. 4,551,329; U.S. Pat. No. Des. 323,417; U.S. Pat. No. 5,176,151; U.S. Pat. No. Des. 320,300; U.S. Pat. No. 3,264,115; and U.S. Pat. No. 2,488,272.

In these respects, the cough drop sucker with cover according to the present invention substantially departs from the conventional concepts and designs of the prior art, and in so doing provides an apparatus primarily developed for the purpose of storing and protecting a cough drop when not in use.

SUMMARY OF THE INVENTION

In view of the foregoing disadvantages inherent in the known types of lollipops now present in the prior art, the present invention provides a new cough drop sucker with cover construction wherein the same can be utilized for storing and protecting a cough drop when not in use.

The general purpose of the present invention, which will be described subsequently in greater detail, is to provide a new cough drop sucker with cover apparatus and method which has many of the advantages of the lollipops mentioned heretofore and many novel features that result in a new cough drop sucker with cover which is not anticipated, rendered obvious, suggested, or even implied by any of the prior art lollipops, either alone or in any combination thereof.

To attain this, the present invention generally comprises a housing having a lower portion with a hollow hemispherical configuration. The lower portion of the housing includes an open top with an upper periphery residing in a common plane. A lip is integrally coupled to the upper periphery and extended radially therefrom. An aperture is formed in a bottom of the lower portion at a central extent thereof, as shown in FIG. 3. The housing further includes an upper portion with a size and shape similar to that of the lower portion. The upper portion includes an open bottom with a lower periphery residing in a common plane. Integrally coupled to an outer surface of the lower periphery is an annular snap which is extended downwardly therefrom with a constant U-shaped cross-section. Note FIG. 5. FIGS. 4 & 5 shows a hinge with a planar oval configuration and constructed from a flexible material. The hinge has a bottom half coupled to an inner surface of the lower portion of the housing adjacent to the upper periphery thereof and extended upwardly therefrom. A top half is coupled to an inner surface of the upper portion of the housing adjacent to the lower periphery thereof such that the upper portion may pivot with respect to the lower portion. By this structure, the upper portion is adapted to pivot with respect to the lower portion between an open orientation with the annular groove and the lip disconnected. The upper portion also has a closed orientation with the annular groove and lip being engaged to define a closed spherical interior space. Next provided is a cough drop having a generally spherical configuration with a diameter less than that of the housing. A linear stick is coupled to the cough drop and extended therefrom along an axis which intersects a center of the cough drop. The stick has a bulbous portion formed at a central extent thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cough drop sucker with cover apparatus and method which has many of the advantages of the lollipops mentioned heretofore and many novel features that result in a new cough drop sucker with cover which is not anticipated, rendered obvious, suggested, or even implied by any of the prior art lollipops, either alone or in any combination thereof.

It is another object of the present invention to provide a new cough drop sucker with cover which may be easily and efficiently manufactured and marketed.

It is a further object of the present invention to provide a new cough drop sucker with cover which is of a durable and reliable construction.

An even further object of the present invention is to provide a new cough drop sucker with cover which is susceptible of a low cost of manufacture with regard to both materials and labor, and which accordingly is then susceptible of low prices of sale to the consuming public, thereby making such cough drop sucker with cover economically available to the buying public.

Still yet another object of the present invention is to provide a new cough drop sucker with cover which provides in the apparatuses and methods of the prior art some of the advantages thereof, while simultaneously overcoming some of the disadvantages normally associated therewith.

Still another object of the present invention is to provide a new cough drop sucker with cover for storing and protecting a cough drop when not in use.

Even still another object of the present invention is to provide a new cough drop sucker with cover that includes a housing being selectably opened and closed. Also included is a sucking drop having a stick coupled thereto and extending therefrom. The stick is slidably connected to the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom view of the present invention.

FIG. 4 is a side view of the present invention with the cough drop extended above the housing for use.

FIG. 5 is a side cross-sectional view of the present invention showing the hinge thereof.

DESCRIPTION OF THE PREFERRED EMBODIMENT

Figures 1, 2:
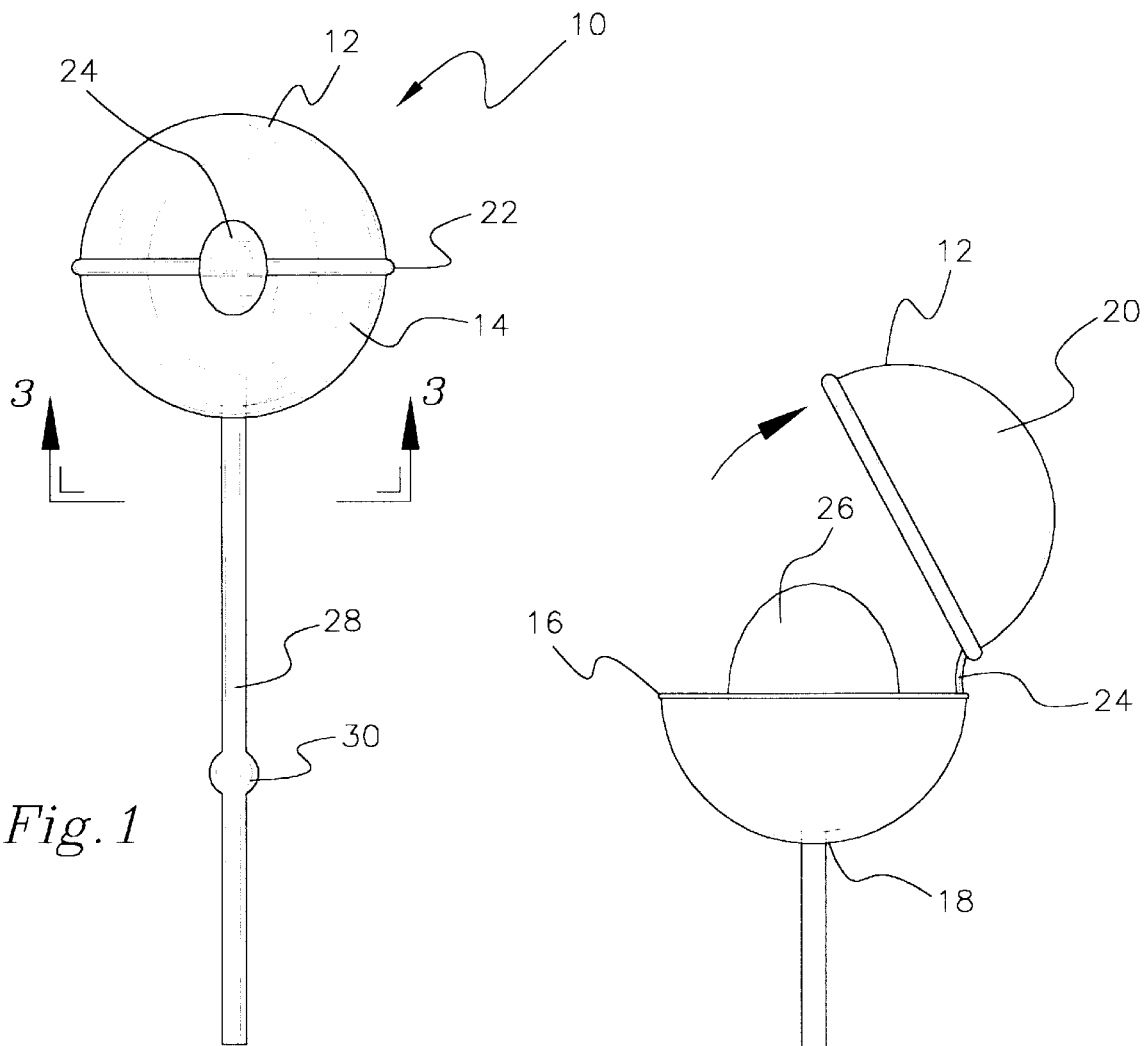
FIG. 1 is a side view of a new cough drop sucker with cover according to the present invention.
FIG. 2 is a side view of the present invention with the housing being in an open orientation.

With reference now to the drawings, and in particular to FIGS. 1 through 5 thereof, a new cough drop sucker with cover embodying the principles and concepts of the present invention and generally designated by the reference numeral 10 will be described.

The present invention, designated as numeral 10, includes a housing 12 constructed from a clear, rigid plastic material and having a lower portion 14 with a hollow hemispherical configuration. The lower portion of the housing includes an open top with an upper periphery residing in a common plane. A lip 16 is integrally coupled to the upper periphery and extended radially therefrom. An aperture 18 is formed in a bottom of the lower portion at a central extent thereof, as shown in FIG. 3.

The housing further includes an upper portion 20 with a size and shape similar to that of the lower portion. The upper portion includes an open bottom with a lower periphery residing in a common plane. Integrally coupled to an outer surface of the lower periphery is an annular snap 22 which is extended downwardly therefrom with a constant U-shaped cross-section. Note FIG. 5.

FIGS. 4 & 5 shows a hinge 24 with a planar oval configuration and constructed from a flexible material. The hinge has a bottom half coupled to an inner surface of the lower portion of the housing adjacent to the upper periphery thereof and extended upwardly therefrom. A top half of the hinge is coupled to an inner surface of the upper portion of the housing adjacent to the lower periphery thereof such that the upper portion may pivot with respect to the lower portion.

By this structure, the upper portion is adapted to pivot with respect to the lower portion between an open orientation with the annular groove and the lip disconnected. As shown in FIG. 4, the upper portion is completely spaced from the lower portion in the open orientation. The upper portion also has a closed orientation with the annular groove and lip being engaged to define a closed spherical interior space.

Next provided is a cough drop 26 having a generally spherical configuration with a diameter less than that of the housing. It should be noted that the cough drop may also take the form of any other type of candy or lozenge. Further, the cough drop is preferably slightly elongated so as to conform to a mouth of a user. A linear stick 28 is coupled to the cough drop and extended therefrom along an axis which intersects a center of the cough drop. The stick also has a bulbous portion 30 formed at a central extent thereof. As shown in FIGS. 1, 2 & 4, the bulbous portion takes the form of a sphere.

In use, the stick of the cough drop is situated within the hole of the lower portion of the housing and slidable between a first orientation and a second orientation. In the first orientation, the cough drop is situated within the housing. In the second orientation, the stick is extended above and spaced from the housing. It should be understood that the bulbous portion serves to preclude the separation of the housing from the stick, as shown in FIG. 4. Furthermore, the housing precludes a child from choking on the cough drop.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cough drop sucker storage assembly comprising, in combination:

a housing including a lower portion with a hollow hemispherical configuration and including an open top with an upper periphery residing in a common plane, a lip integrally coupled to the upper periphery and extending radially therefrom, and an aperture formed in a bottom of the lower portion at a central extent thereof, the housing further including an upper portion with a size and shape similar to that of the lower portion and including an open bottom with a lower periphery residing in a common plane, an annular snap integrally coupled to an outer surface of the lower periphery of the upper portion and extending downwardly therefrom with a uniform U-shaped cross-section;

a hinge with a planar oval configuration and constructed from a flexible material, the hinge having a bottom half coupled to an inner surface of the lower portion of the housing adjacent to the upper periphery thereof and extending upwardly therefrom and a top half coupled to an inner surface of the upper portion of the housing adjacent to the lower periphery thereof such that the upper portion may pivot with respect to the lower portion between an open orientation with the annular groove and the lip disconnected and a closed orientation with the annular groove and lip being engaged to define a closed spherical interior space; and a cough drop sucker comprising a cough drop having a generally spherical configuration with a diameter less than that of the housing and a linear stick coupled to the cough drop and extending therefrom along an axis which intersects a center of the cough drop, the stick having a bulbous, spherical portion formed at a central extent thereof, the stick being situated within the hole of the lower portion of the housing and slidable between a first orientation with the cough drop situated within the housing and a second orientation with the cough drop extended above and spaced from the housing, wherein the bulbous portion serves to preclude the separation of the housing from the stick.

* * * * *